US011347734B1

(12) United States Patent
de Nijs et al.

(10) Patent No.: US 11,347,734 B1
(45) Date of Patent: May 31, 2022

(54) PROCESSING DATABASE QUERIES BASED ON EXTERNAL TABLES

(71) Applicant: Actian Corporation, Round Rock, TX (US)

(72) Inventors: Gilein de Nijs, Boring, OR (US); Willemina Konynenberg, Amsterdam (NL)

(73) Assignee: ACTIAN CORPORATION, Round Rock, TX (US)

( * ) Notice: Subject to any disclaimer, the term of this patent is extended or adjusted under 35 U.S.C. 154(b) by 390 days.

(21) Appl. No.: 15/666,500

(22) Filed: Aug. 1, 2017

Related U.S. Application Data

(60) Provisional application No. 62/376,189, filed on Aug. 17, 2016.

(51) Int. Cl.
*G06F 16/00* (2019.01)
*G06F 16/2453* (2019.01)
*G06F 16/22* (2019.01)
*G06F 16/2455* (2019.01)

(52) U.S. Cl.
CPC .... *G06F 16/24542* (2019.01); *G06F 16/2282* (2019.01); *G06F 16/24568* (2019.01)

(58) Field of Classification Search
CPC ......... G06F 16/24542; G06F 16/24568; G06F 16/2282; G06F 17/30463; G06F 17/30433; G06F 17/30474; G06F 17/30445; G06F 17/30595
See application file for complete search history.

(56) References Cited

U.S. PATENT DOCUMENTS

| | | | |
|---|---|---|---|
| 9,679,012 B1* | 6/2017 | Dorin | G06F 16/24542 |
| 2011/0214165 A1* | 9/2011 | Jeffreys | G06F 16/2471 |
| | | | 726/5 |
| 2013/0073573 A1* | 3/2013 | Huang | G06F 16/254 |
| | | | 707/755 |
| 2014/0214893 A1* | 7/2014 | Annapragada | G06F 16/284 |
| | | | 707/770 |
| 2014/0317084 A1* | 10/2014 | Chaudhry | G06F 16/24552 |
| | | | 707/713 |
| 2016/0253361 A1* | 9/2016 | Nguyen | G06F 16/254 |
| | | | 707/755 |
| 2016/0323262 A1* | 11/2016 | Tan | G06F 21/10 |
| 2017/0063946 A1* | 3/2017 | Quan | H04L 67/20 |
| 2017/0289181 A1* | 10/2017 | Wang | G06Q 20/356 |
| 2017/0289240 A1* | 10/2017 | Ghare | H04L 65/4069 |

* cited by examiner

*Primary Examiner* — Ashish Thomas
*Assistant Examiner* — Suman Rajaputra
(74) *Attorney, Agent, or Firm* — ArentFox Schiff LLP

(57) ABSTRACT

A database system processes database queries that process external tables representing data obtained from an external systems. The database system generates an execution plan to execute the database query. The database system sends a request for data of the external table to an external system. The request provides connection information to the external system. The external system sends a request to connect to the database system and provides data of the external table as a data stream. If the database system reaches an operator that processes the data of the external table, the database system waits for data from the external system. The database system processes the database query using the data of the data stream. The database system provides the result of the database query to a requestor, for example, a client device.

20 Claims, 5 Drawing Sheets

PROCESSING DATABASE QUERIES BASED ON EXTERNAL TABLES

CROSS REFERENCES TO RELATED APPLICATIONS

This application claims the benefit of U.S. Provisional Application No. 62/376,189, filed on Aug. 17, 2016, which is incorporated by reference in its entirety.

FIELD OF INVENTION

This application relates generally to database systems processing database queries and in particular to database systems processing database queries based on external tables comprising data stored in external systems.

BACKGROUND

Databases store large amount of data that is processed in response to database queries. For example, relational databases store data organized as tables and execute database queries that process data of one or more tables. A database system may process data received from an external system. One mechanism used by database systems to process data received from an external system is to extract the data from the external system and store it as tables within the database system. However, such mechanisms require a preprocessing step in which the data of the external system is imported. Furthermore, such database systems require additional storage to store all the data received from the external system before the database query is processed.

Other conventional database systems create a connection with the external systems so that the database system can access the data from the external system. To allow the database system to create a connection, the external system has to grant access to the database system. An external system may store sensitive information besides the information that is processed by the database queries. Therefore, administrators of the external system may not prefer to allow the database system to access data of the external system. Conventional techniques for processing database queries that process external data have at least the above mentioned drawbacks.

SUMMARY

Embodiments of a database system execute database queries that process data of external tables. The data may be stored in a table stored in the database system or an external table comprising data stored in an external system. A database system receives a description of an external table, for example, a statement that registers an external table with the database system. The database system receives a database query that processes data of one or more tables including the external table. The database system generates an execution plan for the database query. The execution plan includes one or more external table operators for processing data of the external table. The database system provides data stream connection information to the external system for allowing the external system to create a data stream connection to the database system. For example, the data stream connection information may include a host address, address of a port of the database system, user name, and password to create a connection. The database system executes the database query by waiting for the external system to create the data stream connection with the database system. The database system interacts with the external system using the data stream connection. For example, the database system may wait for the external system to provide data of the external table. The database system processes the database query responsive to receiving the data from the external system.

In an embodiment, the database system generates an execution plan for the database query. The execution plan comprises one or more external table operators. The database system executes an external table operator by waiting for a data stream connection from the external system. The database system receives a request for a data stream connection from the external system. The database system interacts with the external system using the data stream connection.

Examples of external table operators are external table scan operator, external table insert operator, external table modify operator, and external table delete operator. As an example, the database system executes an external table scan operator by receiving data for the external table from the external system via the data stream connection. As another example, the database system executes an external table insert operator by providing records to be inserted in the external table to the external system via the data stream connection. As another example, the database system executes an external table modify operator by receiving some records from the external system, modifying the received records, and providing the modified records to the external system via the data stream connection. As another example, the database system executes an external table delete operator by providing information identifying a set of records to be deleted from the external table to the external system via the data stream connection. The external system executes instructions corresponding to the external table operator being performed by the database system. For example, the external system performs a modification to a representation of the external table, for example, by inserting records, modifying records, or deleting records, depending on the operator being executed by the database system.

In an embodiment, the database system provides the output of the external table operator to one or more other operators of the execution plan. The database system completes the execution of the execution plan of the database query to obtain a result set. The database system may store the result of execution of the database query or send the result to the system that requested the result, for example, a client device.

In an embodiment, the external system executes a database query, for example, a select operation on a system table of the database system to receive data stream connection information. If the database system executes an external table operator, the database system inserts the required data stream connection information in the system table. The execution of the select statement causes the data stream connection information to be provided to the external system. The external system uses the data stream connection information to connect with the database system to either provide data or receive data from the database system depending on the type of database query or statement being executed by the database system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for read-

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1A:
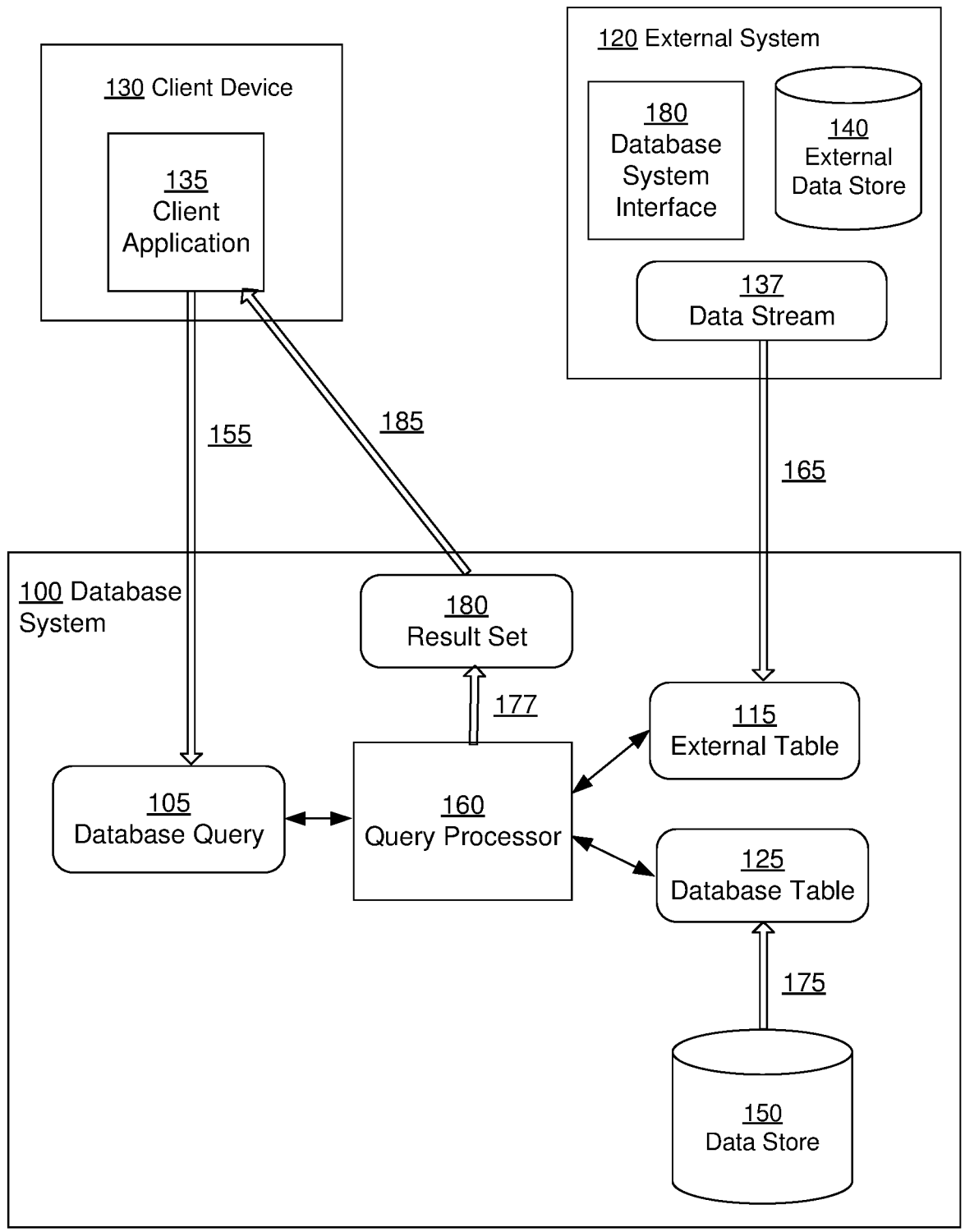
FIG. 1A shows the overall system environment illustrating processing of database queries based on external tables, in accordance with an embodiment of the invention.

FIG. 1A shows the overall system environment illustrating processing of database queries based on external tables, in accordance with an embodiment of the invention. The overall system environment comprises a database system 100, one or more client devices 130, and one or more external systems 120. The various systems shown in FIG. 1A interact with each other via a network (not shown in FIG. 1A). The database system 100 receives database queries 105 from client devices 130 and processes them to generate results that are returned to the client device 130.

In one embodiment, the client device 130 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 130 can be any device having computer functionality, such as a personal digital assistant (PDA), mobile telephone, smartphone, etc. In an embodiment, a client of the database system can be another process, for example, a web server that serves queries from remote devices.

Client device 130 executes client application 135, e.g., a web browser or built-in client application, to interact with the parallel database system 100 via a network. A user of the client device 130 uses the client application 135 that generates a database query and sends 155 the database query to the database system 100. The terms "client" or "client device," as used herein may refer to software providing respective functionality, to hardware on which the software executes, or to the entities operating the software and/or hardware, as is apparent from the context in which the terms are used. For example, a client device 130 may execute business intelligence software or analytic tools that send interact with a database system.

The database system 100 includes a query processor 160 that receives the database queries 105 and processes them. A database query refers to a request for data from the database system or a statement for performing operations on data, for example, insert operation, delete operation, or modify operation. In an embodiment, the database system 100 is a relational database system that stores data as relational tables. A database query 105 specifies processing of data of one or more tables of the database system. In an embodiment, the database query is specified using syntax of a database query language, for example, structured query language (SQL). The database query may be represented by any query language that is supported by the database system. In some embodiments, the database system 100 represents data in a format other than relational, for example, as objects.

Embodiments allow the database system 100 to process database queries based on external tables. An external table of the database system 100 represents data stored in an external system 120. In an embodiment, the external system 120 is an online system that generates data, for example, data representing transactions executed by users. The external system 120 formats the data and sends it to the database system 100. The database system 100 receives the data and processes the data as an external table 115. The database system 100 executes database queries using the data of the external table 115. In some embodiments, the database system 100 represents data as a set of records and sends the data to the external system 120. The external system 120 receives the data and processes it, for example, by storing the data in a data representation of the external system 100. The data representation of the data of the external table in the external system 100 may be different from the data representation of the external table in the database system 100.

The external system 120 may be another database system, for example, a parallel database system or a single processor database system that interacts with the database system 100. The external system 120 may be a file system, for example, a distributed file system. The external system 120 is a big data system, for example, a SPARK system or a HADOOP system. The external system 120 may be a distributed source of data for example, a plurality of devices such as mobile devices. Accordingly, the external table represents data gathered from the plurality of devices.

The external system 120 comprises an external data store 140, and a database system interface 180. Other embodiments of external systems 120 may include more or different components. The external system 120 stores data in the external store 140. The external store 140 may be a database, a file system, or any other module configured to store data. In an embodiment, the external system 100 generates data of the external table by performing certain computations.

The database system interface 180 of the external system 120 performs the interactions with the database system 100. The database system 100 specifies a protocol for interaction with the database system 100. A database system interface 180 of the external system 120 interacts with the database system by conforming to the protocol specified by the database system 100. The database system interface 180 retrieves data stored in the external data store 140 to generate a data stream 137 that is sent to the database system 100. The data stream 137 is formatted to a format pre-specified by the database system 100. Accordingly, the database system 100 receives the data stream 137 and processes the received data as the external table 115.

The database system 100 processes database queries that combine data stored in one or more tables stored within the database system 100 with data from external systems. Alternatively, the database query may process data of one or more external tables. Assume that the database query 105 shown in FIG. 1A joins data of a database table 125 and an external table 115 based on data received from external system 120. The query processor 160 retrieves 175*b* the data of the database table 125 from the data store 150. The query processor 160 receives data of the data stream 137 sent by the external system 120 and processes the data as the external table 115. The query processor 160 processes the data of the database table 125 and the external table 115 based on the specification of the database query 105 to generate 177 the result set 180. The database system 100 sends 185 the generated result set 180 to the system providing the database query 105, for example, the client application 135 executing on the client device 130.

In an embodiment, the database system 100 generates an execution plan for the database query 105. The execution plan comprises operators representing reusable steps that are executed by the database system. The execution plan specifies the sequence in which the operators are executed. Each operator receives one or more inputs and generates an output. The output of an operator may be provided as input to another operator specified by the execution plan. The query processor 160 executes the execution plan of the database query 105.

The database system 100 uses external table operators for processing external tables. The database system 100 executes an external table operator by sending information for establishing a data stream connection with the database system 100 to the external system 120. Example of information for establishing a data stream connection with the database system 100 include credentials required for establishing the connection, the port of the database system 100 to which the external system 120 needs to send the data stream, and so on. The query processor 160 waits for data of the data stream 137 from the external system 120. When the external system provides the data of the data stream 137, the query processor 160 proceeds with execution of the external table operator to generate the output of the external table operator. The query processor 160 may provide the output of the external table operator to other operators as specified by the execution plan. The query processor 160 completes the execution of the execution plan to generate the result set 180.

The interactions between the client devices 130 and the database system 100 are typically performed via a network, for example, via the internet. The network enables communications between the client device 130 and the database system 100. In one embodiment, the network uses standard communications technologies and/or protocols. In another embodiment, the entities can use custom and/or dedicated data communications technologies instead of, or in addition to, the ones described above. Depending upon the embodiment, the network can also include links to other networks such as the Internet.

Parallel Database System

Figure 1B:
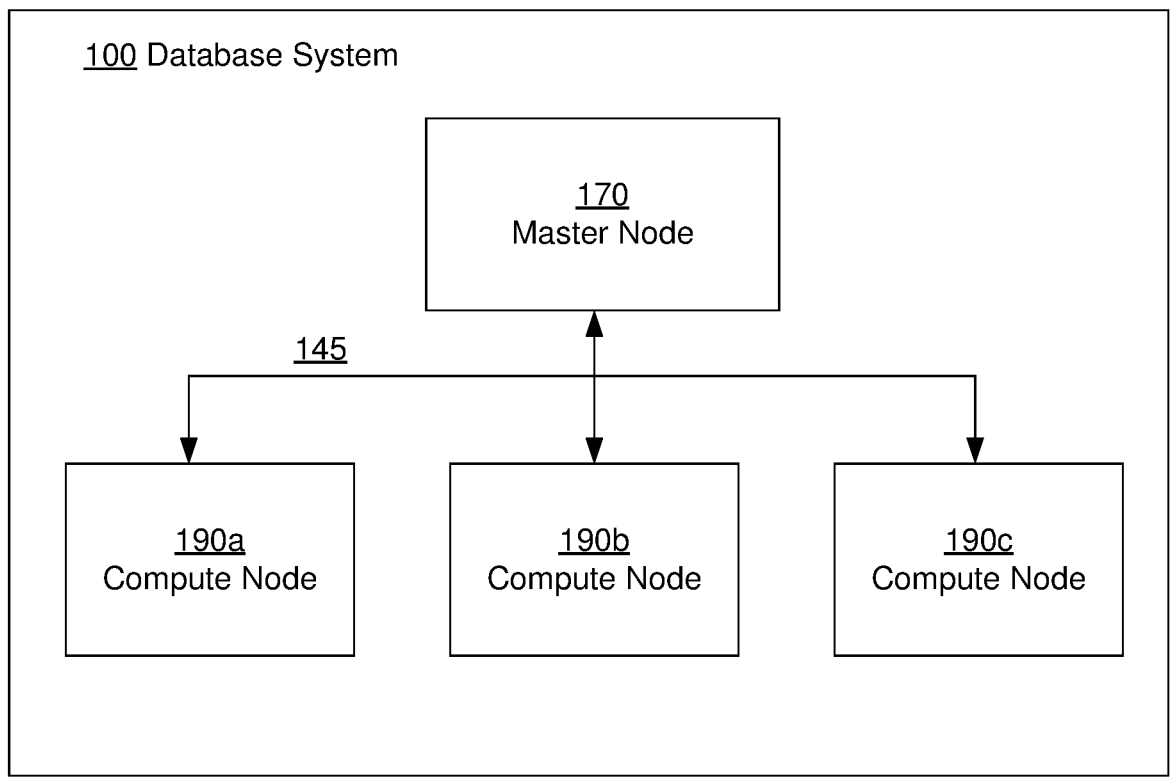
FIG. 1B shows the architecture of a database system for processing database queries based on external tables, in accordance with an embodiment of the invention.

FIG. 1B shows the architecture of a database system for processing database queries based on external tables, in accordance with an embodiment of the invention. Although the embodiment shown in FIG. 1B shows a parallel database, the techniques disclosed herein for processing database queries based on external tables can be implemented on database systems executing on single processor architectures or on other types of distributed or parallel database architectures.

The database system 100 shown in FIG. 1B includes a master node 170, one or more compute nodes 190, and an interconnection network 145. (A letter after a reference numeral, such as "130*a*," indicates that the text refers specifically to the element having that particular reference numeral, while a reference numeral in the text without a following letter, such as "130," refers to any or all of the elements in the figures bearing that reference numeral.)

The master node 170 controls the execution of the compute nodes 190. All nodes 120 and 130 communicate with each other via the interconnection network 145. The master node 170 and the compute nodes 190 can comprise any type of processor, for example, standard x86 servers running Linux or multi-core systems. Users and applications may communicate with the system via the master node by using standard interfaces, ANSI SQL via ODBC/JDBC (in general, "the system" or "the parallel database system" or "database system" or "database" refers to a database system 100 herein unless stated otherwise.)

The master node 170 may be connected to the network and may interface with external applications and other computers using the network. A master node 170 manages communications with the compute nodes. In an embodiment, the master node 170 controls sessions, parsing and optimizing queries, and scheduling execution of the workload. The master node may or may not participate in data operations. The master node 170 may be optimized for outward communication and handling of query overhead so the resources of the compute nodes are utilized for performing data operations.

Compute nodes 190 are the components of the parallel database system 100 that perform processing and storing of data. Each compute node 190 stores and manages a subset of rows of each table. For example, if a table has 1 billion rows and there are 20 compute nodes, then approximately 50 million rows are distributed to each compute node 190.

Data may be distributed to a particular compute node 190 based on a particular data distribution strategy, for example, based on a hashing algorithm applied to a distribution key, or by round robin. Distribution keys, such as the primary key or other popular join column may be used for even distribution of data, especially when queries are likely to benefit from collocated joins by using the same distribution key. In cases where an inherently balanced distribution key isn't obvious or doesn't exist, round robin distribution may be used to balance the data.

By utilizing multiple methods of data distribution, it is possible to maintain the appropriate balance between data distribution and performance so the parallel database system 100 can take best advantage of its resources and provide good parallel efficiency. The performance of the parallel database system 100 is typically driven by the number of compute nodes 190 present.

The interconnection network 145 allows the various compute nodes and the master node 170 to interact with each other. The interconnection network 145 may implement various paradigm of communication, for example, distributed shared memory, remote procedure calls, message passing interface, and so on. In an embodiment, database tables are distributed across the compute nodes 190. For example, each compute node 190 may receive a portion of a database table.

In an embodiment, the master node 170 receives a database query from a client device 130 and generates execution plan for a database query. The master node 170 sends the execution plan to different compute nodes 190 and the compute nodes 190 together execute the execution plan to process the database query. Each compute node 190 performs a portion of the computation of the database query for the data stored on the compute node 190.

In an embodiment, each compute node 190 communicates with an external system 120 in parallel, for example, to send or receive data in parallel. The external system 120 creates data stream connections with the compute nodes. The compute nodes 190 send or receive data using the connection. The database system 100 provides the information necessary to the external system 120 that allows the external system 120 to create data stream connections with the compute nodes 190. The external system 120 and the database system 100 may connected by parallel communication network that can transmit data in parallel between the external system 120 and the database system 100.

Architecture of Database System

Figure 2:
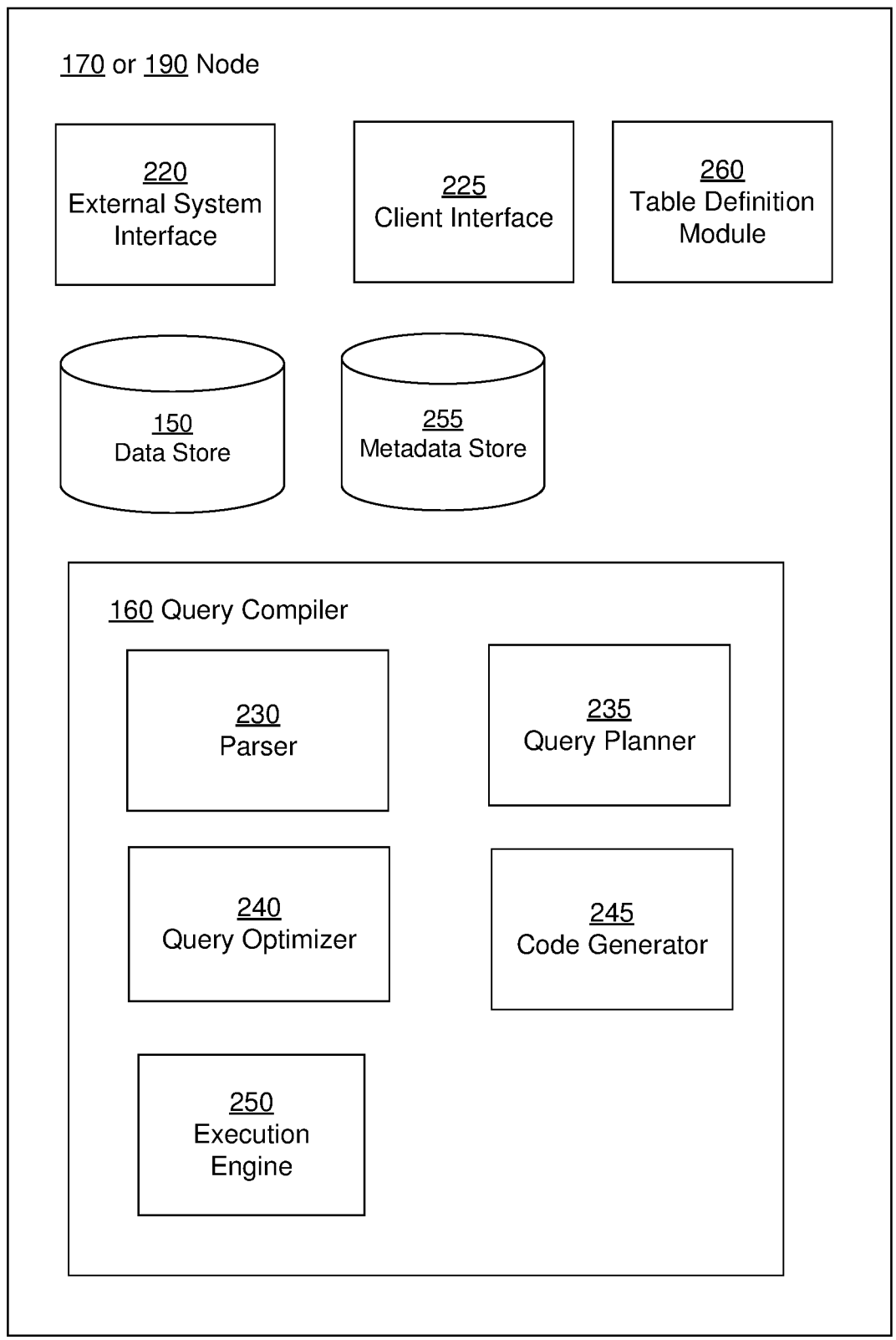
FIG. 2 shows a high level view of the system architecture and the internal components of the database system, in accordance with an embodiment.

FIG. 2 shows a high level view of the system architecture of a node of the database system, in accordance with an embodiment. The node 170, 190 represents one or more of the master node 170 and compute nodes 190. The node 170, 190 includes an external system interface 220, a query processor 160, an execution engine 250, a table definition module 260, a data store 150, and a metadata store 255. In alternative configurations, different and/or additional modules may be included in the system.

The data store 150 stores data of the database system, for example, tables storing data for a relational database system. Each compute node 190 maintains a data store 150. A small table may be replicated across all compute nodes 190. However a large table is typically distributed across a plurality of compute nodes 190 such that a portion of the table is stored in each compute node.

The metadata store 255 stores metadata describing the data stored in the data store 150, for example, description of tables stored in the data store 150. The metadata stored in the metadata store 255 includes the data types of data stored in each column of the tables stored in the data store 150, information describing various constraints associated with tables, information describing distribution of the data of a table across various compute nodes 190, and so on.

The external system interface 170 allows the node 170, 190 to interact with external systems 120, for example, by importing/exporting data from/to an external system 120. The external system interface 170 receives data processed by the database system from the external systems 120 and also sends results of processing database queries to the external systems 120.

The client interface 225 allows a master node 170 or a compute node 190 to interact with client devices 130. Typically the master node 170 interacts with client devices 130. In an embodiment, if the master node 170 receives a new client request to execute a database query or some other database operation, the master node 170 spawns a process to maintain session information for that client. That process is maintained as long as the client session remains open and that client is sending query requests to the master node 170.

The table definition module 260 receives commands that specify definitions of tables. The table definition commands may be specified by a user using a client device 130. A table definition command specifies various attributes of a table, for example, names of various columns of the table, data types of the columns, constraints associated with the table and so on. The table definition module 260 allows users to specify whether a table is an external table. In an embodiment, the table definition module 260 creates a new table in the data store 150 and stores metadata describing the table in the metadata store 255 in response to receiving a table definition if the specified table is not an external table.

The query processor 160 performs the various operations necessary to execute a database query. The query processor 160 comprises components including a query parser 230, a query optimizer 240, a query planner 235, an execution engine 250, and a code generator 245. The query parser 230 parses a database query to ensure that there are no syntax errors in the query. If a well formed query is provided to the database system 100, the query parser 230 builds appropriate data structures to perform further processing of the query, for example, query optimization or code generation.

The query optimizer 240 performs optimizations to improve performance of execution of database queries. For example, the query optimizer 240 may rewrite portions of the query such that the rewritten query can be executed more efficiently compared to the original query. The query optimizer 240 may determine an order in which various tables joined by the database query are processed.

The query planner 235 generates an execution plan for executing a query. The execution plan comprises various operators and the order of execution of the various operators. Examples operators include, hash operator for building hash table for use in hash joins, hjoin operator for performing hash join of two tables or intermediate result sets, merge operator for merging rows of two tables, scan operator for performing scans of tables or intermediate result sets, either sequentially or with a range-restricted scan, sort operator for sorting rows or intermediate result sets as required by other subsequent operations (such as joins or aggregations) or to satisfy an ORDER BY clause, dist operator for distributing rows to nodes for parallel joining purposes or other parallel processing, and nloop operator for performing a nested-loop join of two tables or intermediate results.

If the database query processes external tables, the execution plan comprises external table operators. Examples of external table operators include an external table scan operator, external table insert operator, external table modify operator, an external table delete operator, and so on. The various external table operators interact with the external system via a data stream connection established by the external system with the database system.

The external table scan operator receives data of the external table from the external system via the data stream connection and provides results based on the received data to the client device requesting results of the database query. The external table insert operator provides a set of records to the external system to insert in the data representation of the external table stored by the external system. The external table modify operator receives a set of records from the external system via the data stream connection, modifies information of the set of records and sends the set of modified records to the external system via the data stream connection. The external table delete operator sends information identifying a set of records to be deleted to the external system via the data stream connection.

The external system 120 executes instructions corresponding to each external table operator processed by the database system 100. For example, if the database system executes an external table scan operator, the external system loads data for the data stream, formats the data to conform to the protocol of the database system and sends the data to the database system via the data stream connection. If the database system executes an external table delete operator, the external system receives information identifying the records to be deleted from the database system via the data stream connection and either marks the records as deleted or deletes the records by updating the data representation of the external table stored in the external system. If the database system executes an external table insert operator, the external system receives the records to be inserted from the database system via the data stream connection and transforms the records to a format in which the external system stores the records in the external data store 140 and inserts the records in the external data store 140. If the database system executes an external table modify operator, the external system first reads data corresponding to the external table, formats it according to the protocol of the database system, sends the records to the database system. The external system 120 also receives the modified records from the database system via the data stream connection and transforms the modified records to a format in which the external system stores the records in the external data store 140 and saves the records in the external data store 140.

The execution engine 250 executes the query by executing the execution plan provided by the query planner 235. The execution engine 250 executes 340 the various operators of the execution plan in the order specified by the execution plan. In an embodiment, an external table operator may provide data as input to another operator. The database system pipelines execution of the other operator with execution of the external table operator such that the database system starts execution of the other operator before all the data of the data stream is received from the external system.

Process of Executing Database Queries

Figure 3:
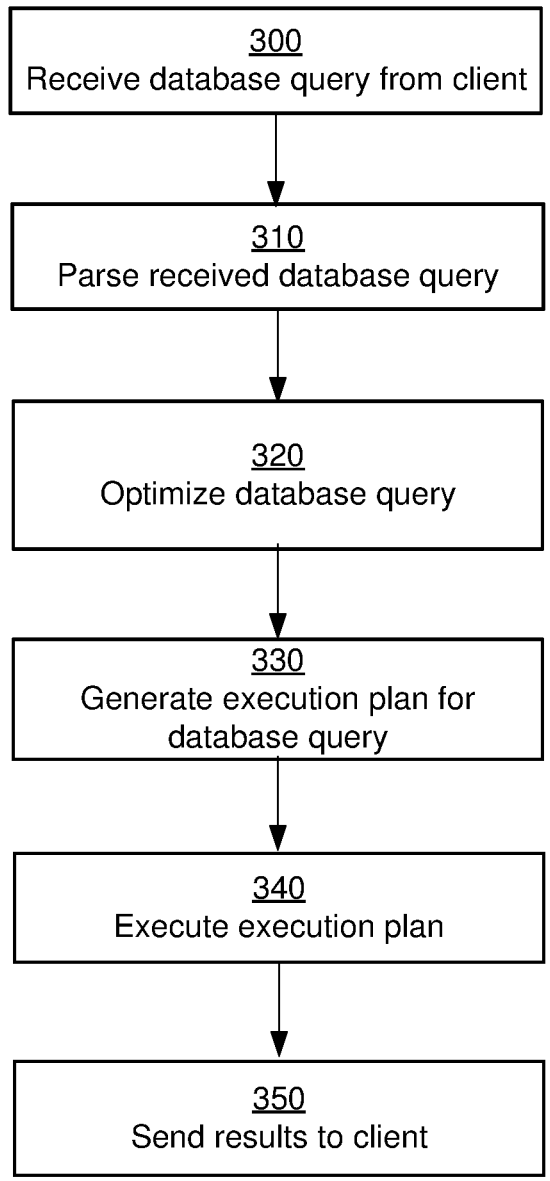
FIG. 3 shows a flowchart illustrating the processing of database queries by the database system, in accordance with an embodiment.

FIG. 3 shows a flowchart illustrating the processing of database queries by the database system, in accordance with an embodiment. These steps may be performed in an order other than that shown in FIG. 3. Furthermore, each step of the flowchart can be performed by modules different from those indicated below.

The master node 1720 receives 300 a database query 105 from a client device 130, for example, an SQL query. The query parser 230 parses 310 the database query received to generate a data structure representing the query. The data structure representing the query identifies the various clauses of the query, for example, the tables processed by the query, any filter conditions, any clause for ordering the result of the query, any clause for specifying the columns of the results and so on.

The query optimizer 240 performs 320 various query optimizations so as to improve execution of the query. The query planner 235 generates 330 the execution plan for the database query. The execution engine 250 executes 340 the generated execution plan of the database query. The client interface 225 sends 350 the result of the execution of the database query to the system or device that requested the results, for example, the client device 130.

The various compute nodes 190 may generate portions of the result and provide the results to the master node 170. The master node 170 sends 350 the result to the system or device that requested the results, for example, the client device 130. In an embodiment, the results are provided in parallel to an external system directly by the compute nodes 190 without transferring the partial results to the master node 170. Each compute node executes 360 the query for the portion of data present on the compute node 190.

The external table operator may provide a first set of records to the other operator. The other operator processes the first set of records and returns the result to another operator or as a result of the database query. Subsequently, the external table operator provides a second set of records to the other operator. The other operator processes the second set of records and returns the result to another operator or as a result of the database query. This processing may continue until the entire data of the external table is processed.

In an embodiment, an external table operator may receive as input, data generated as output by another operator. The database system pipelines execution of the external table operator with the execution of the other operator such that the database system starts processing the external table operator to transmit data to the external system before the other operator has provided all the data to the external table operator.

For example, the execution of the operators may proceed as follows. The external table operator receives a first set of records from the other operator and transmits to the external system. Subsequently, the external table operator receives a second set of records from the other operator. The other operator processes the second set of records and returns the result to another operator or as a result of the database query. The pipelined execution may continue until the entire data of the external table is processed.

The external system 120 may create a plurality of data stream connections with the database system for performing parallel data transfer between the two systems. Accordingly, the processing of various portions of an external table may be performed in parallel. For example, various compute nodes of a parallel database system may interact with various nodes of a parallel external system via data stream connections in parallel.

In an embodiment, the database system 100 receives a plurality of records from the external system 120 and stores them in a buffer for processing. However, the data may be processed as it arrives. Accordingly, the external system 120 provides data to the database system 100 as a data stream that is processed by the database query as it arrives.

Interaction Between the Database System and the External System

Figure 4:
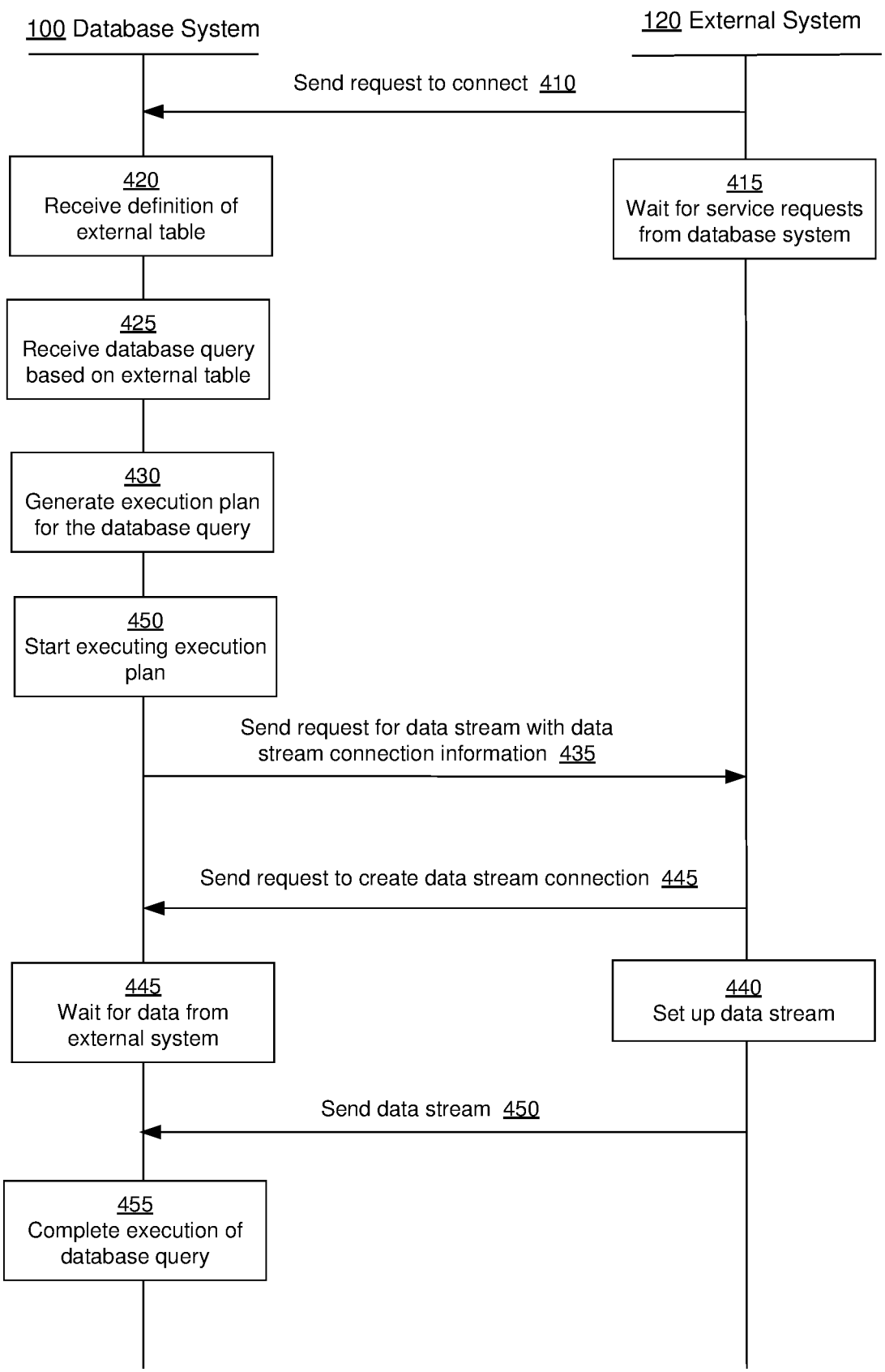
FIG. 4 shows an interaction diagram illustrating the interactions between an external system and a database system processing of database queries that access external tables representing data of the external system, in accordance with an embodiment.

FIG. 4 shows an interaction diagram illustrating the interactions between an external system and a database system processing of database queries that access external tables representing data of the external system, in accordance with an embodiment. The steps shown in the interaction diagram may be executed in an order different from that indicated in FIG. 4. Furthermore, the steps may be performed by modules different from those indicated herein.

The external system 120 receives information necessary for establishing a connection with the database system 100. The information may be provided by the database system 100 or by a user interacting with the external system 120, for example, using a client device 130. The database system interface 180 of external system 120 sends 410 a request to create a connection with the database system 100. The database system interface 180 executes a process that waits for requests for data from the database system 100.

The table definition module 260 of the database system 100 receives 420 a definition of an external table. In an embodiment, the definition of the external table identifies the external system 120 that provides the data of the external table. The table definition module 260 processes the definition of the external table to identify metadata describing the external table and stores the metadata describing the external table in the metadata store 255. In an embodiment, the step 410 is performed responsive to the step 420. Accordingly, the database system 100 identifies the external system 120 based on the definition of the external table and sends information for establishing a connection with the database system to the external system 120.

The database system 100 receives 425 a database query based on the external table. The query processor 160 of the database system 100 generates an execution plan for the database query. The generated execution plan includes one or more external table operators and may include one or more operators that are not external table operators.

The external system interface 220 of the database system 100 sends 435 a request for data of the data stream for the external table. The request includes data stream connection information, for example, port addresses of the compute nodes for use by the external system 120 for sending data of the data stream to the database system 100.

The database system interface 180 of the external system 120 sets 440 up the data stream for providing data of the external table. The database system interface 180 retrieves the data from the external data store 140 and formats the data for sending as a data stream. The database system interface 180 of the external system 120 sends 445 a request to create a data stream connection to the database system. The data stream connection may connect to a specific compute node of the database system. The database system interface 180 of the external system 120 may request creation of multiple data stream connections, for example, to connect to different compute nodes of the database system.

The query processor 160 starts 450 executing the execution plan by processing the operators in the order specified by the execution plan. If the query processor 160 starts execution of an external table operator, the query processor 160 waits 445 for data from the external system 120. The database system interface 180 of the external system 120 sends 450 the data of the data stream to the database system 100. The external system interface 220 of the database system 100 receives the data of the data stream. The query processor 160 completes execution of the external table operator based on the data of the external table received from the external system 120. The query processor 160 completes execution of the execution plan to generate the result set based on the database query. The database system 100 stores the result of the database query in the data store 150 and sends the result set to the client device 130.

In an embodiment, the external system 120 receives code generated by the database system and executes the generated code for performing various operations related to the data stream, for example, setting up the data stream and sending the data of the data stream. In an embodiment, the external system 120 receives information necessary for making a data stream connection from the database system by executing a dummy database query, for example, a select query that retrieves data stored in a system table. The external system 120 waits for the information since it blocks on the execution of the select statement, until the database system is ready to execute a database query. The database system 100 determines the data stream connection information based on the original database query and adds the data stream connection information to the system table. As a result of executing the dummy database query, i.e., the select statement on the system table, the database system 100 returns the data stream connection information to the external system 120. After the external system 120 receives the data stream connection information, the external system 120 connects to the database system 100 as a client.

In an embodiment, the implementation of the external system 100 may be upgraded and the same database query based on an external table stored in the external system 100 can be executed by the database system 100 using the upgraded external system 120 without requiring any modifications to the database system 100. For example, the external system 100 may be upgraded to a newer version of an operating system. Alternatively, the implementation of the database system interface 180 may be modified to use a different programming language. However, the database system 100 can continue to execute the database query against the external system 100 so long as the modified external system 100 conforms to the protocol specified by the database system for interacting with the database system 100.

In an embodiment, if the external system 100 is a parallel system comprising multiple nodes, a node of the external system 120 sends a data stream to a compute node of the database system 100. The external system 120 may change the node of the external system 100 that provides the data stream to the compute node of the database system 100. The database system 100 continues processing the database query even if the external system 120 changed the node providing the data stream during the execution of the database query. Alternatively, the database system 100 may perform a first execution database query based on an interaction with a first node of the external system 120 and a subsequent execution of the same database query with a second node of the external system 120, for example, due to a failure of the first node. The database system 100 does not require any modification to the implementation of the external table or the database query between the two executions.

Alternative Applications

Several embodiments are described herein using a parallel database architecture. However, other embodiments based on a single processor architecture are foreseeable. Furthermore, although the parallel architecture is disclosed herein as having a master node and a plurality of compute nodes, other parallel configurations can be used. For example, any one of the compute nodes can act as a master node. The parallel architecture can be based on a shared memory. Alternatively, the parallel architecture may comprise a distributed system of independent computers interconnected via a network.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A computer-implemented method for executing database queries based on external tables, the method comprising:

receiving, by a database system, description of an external table, the description identifying an external system as a source of the external table;

receiving a database query processing data of one or more tables, the one or more tables including the external table;

generating execution plan for the database query, the execution plan comprising one or more external table operators for processing data of the external table;

executing, by the database system, the execution plan, comprising:

sending, by the database system, to the external system, a data request for the external table, wherein the data request includes data stream connection information comprising credentials for allowing the external system to establish a data stream connection with the database system;

receiving, by the database system, from the external system, a request to create the data stream connection associated with the one or more external table operators, the request indicating the credentials included in the data stream connection information to establish, by the external system, the data stream connection with the database system; and responsive to establishing the data stream connection with the external system:

performing, where the external table operator is an external table scan operator, receiving a data stream from the external system via the data stream connection;

performing, where the external table operator is an external table insert operator, sending a data stream to the external system via the data stream connection;

performing, where the external table operator is an external table modify operator, receiving a set of records from the external system via the data stream connection, modifying the records, and sending a set of modified records to the external system via the data stream connection; and performing, where the external table operator is an external table delete operator, sending information identifying a set of records to the external system via the data stream connection for deletion; and storing a result of execution of the execution plan.

2. The computer-implemented method of claim 1, wherein executing the execution plan further comprises:

providing an execution result of execution of an external table operator of the one or more external table operators to another operator of the execution plan.

3. The computer-implemented method of claim 2, wherein the other operator receives data as input from the external table operator and the database system pipelines execution of the other operator with execution of the external table operator such that the database system starts execution of the other operator before all the data of the data stream is received from the external system.

4. The computer-implemented method of claim 2, wherein the other operator provides data as input to the external table operator and the database system pipelines execution of the external table operator with the other operator such that the database system starts processing the external table operator to transmit data to the external system before the other operator has provided all the data to the external table operator.

5. The computer-implemented method of claim 1, wherein the database query is a first database query, wherein sending the data request by the database system is in response to a request to execute a second database query received from the external system, the second database query requesting information stored in a system table of the database system.

6. The computer-implemented method of claim 5, wherein the database system stores the data stream connection information in the system table such that the execution of the second database query provides the data stream connection information to the external system.

7. The computer-implemented method of claim 1, further comprising:

generating executable code configured to provide data to the database system; and sending the generated executable code to the external system, wherein the external system executes the generated executable code for providing the data stream to the database system.

8. The computer-implemented method of claim 1, wherein receiving, by a database system, description of an external table comprises, receiving a data definition language statement that registers the external table with the database system.

9. The computer-implemented method of claim 1, wherein the database system comprises a plurality of compute nodes, each compute node executing an external table operator of the one or more external table operators, wherein each compute node receives a different data stream connection from the external system for performing parallel data transfer.

10. The computer-implemented method of claim 1, wherein the database query is a first database query, further comprising:

receiving, by the database system, from the external system, a request to execute a second database query; and wherein sending the data request by the database system is in response to the request to execute the second database query received from the external system.

11. The computer-implemented method of claim 1, wherein the data stream connection information further comprises a port number for the database system, wherein the external system sends a request to create a connection with the database system at the port number specified in the connection information.

12. The computer-implemented method of claim 9, wherein each compute node sends data to one of the one or more external systems corresponding to one of the one or more table operators without sending the data to a master node of the database system.

13. The computer-implemented method of claim 1, wherein performing one or more of: receiving a data stream from the external system or sending a data stream to the external system via the data stream connection includes performing receiving the data stream from the external system as part of processing the database query, and wherein processing the database query includes processing data received from the external system as it arrives in the data stream.

14. The computer-implemented method of claim 1, wherein executing the execution plan further comprises blocking on execution of the database query at least until the request to create the data stream connection is received from the external system.

15. A computer readable non-transitory storage medium storing instructions thereon, the instructions when executed by a processor cause the processor to perform the steps of:
receiving, by a database system, description of an external table, the description identifying an external system as a source of the external table;
receiving a database query processing data of one or more tables, the one or more tables including the external table;
generating execution plan for the database query, the execution plan comprising one or more external table operators for processing data of the external table;
executing, by the database system, the execution plan, comprising:
sending, by the database system, to the external system, a data request for the external table, wherein the data request includes data stream connection information comprising credentials for allowing the external system to establish a data stream connection with the database system;
receiving, by the database system, from the external system, a request to create the data stream connection associated with the one or more external table operator, the request indicating the credentials included in the data stream connection information to establish, by the external system, the data stream connection with the database system; and
responsive to establishing the data stream connection with the external system:
performing, where the external table operator is an external table scan operator, receiving a data stream from the external system via the data stream connection;
performing, where the external table operator is an external table insert operator, sending a data stream to the external system via the data stream connection;
performing, where the external table operator is an external table modify operator, receiving a set of records from the external system via the data stream connection, modifying the records, and sending a set of modified records to the external system via the data stream connection; and
performing, where the external table operator is an external table delete operator, sending information identifying a set of records to the external system via the data stream connection for deletion; and
storing a result of execution of the execution plan.

16. The computer readable non-transitory storage medium of claim 15, wherein the database query is a first database query, wherein sending the data request by the database system is in response to a request to execute a second database query received from the external system, the second database query requesting information stored in a system table of the database system.

17. The computer readable non-transitory storage medium of claim 16, wherein the database system stores the data stream connection information in the system table such that the execution of the second database query provides the data stream connection information to the external system.

18. The computer readable non-transitory storage medium of claim 15, further comprising:
generating executable code configured to provide data to the database system; and
sending the generated executable code to the external system, wherein the external system executes the generated executable code for providing the data stream to the database system.

19. The computer readable non-transitory storage medium of claim 15, wherein the database system comprises a plurality of compute nodes, each compute node executing an external table operator of the one or more external table operators, wherein each compute node receives a different data stream connection from the external system for performing parallel data transfer.

20. A computer-implemented system for scheduling queries for execution in a database system, the system comprising:
a computer processor; and
a computer-readable storage medium storing instructions thereon, the instructions when executed by the computer processor cause the processor to perform the steps of:
receiving, by a database system, description of an external table, the description identifying an external system as a source of the external table;
receiving a database query processing data of one or more tables, the one or more tables including the external table;
generating execution plan for the database query, the execution plan comprising one or more external table operators for processing data of the external table;
executing, by the database system, the execution plan, comprising:
sending, by the database system, to the external system, a data request for the external table, wherein the data request includes data stream connection information comprising credentials for allowing the external system to establish a data stream connection with the database system;
receiving, by the database system, from the external system, a request to create the data stream connection associated with the one or more external table operator, the request indicating the credentials included in the data stream connection information to establish, by the external system, the data stream connection with the database system; and responsive to establishing the data stream connection with the external system:
- performing, where the external table operator is an external table scan operator, receiving a data stream from the external system via the data stream connection;
- performing, where the external table operator is an external table insert operator, sending a data stream to the external system via the data stream connection;
- performing, where the external table operator is an external table modify operator, receiving a set of records from the external system via the data stream connection, modifying the records, and sending a set of modified records to the external system via the data stream connection; and
- performing, where the external table operator is an external table delete operator, sending information identifying a set of records to the external system via the data stream connection for deletion; and storing a result of execution of the execution plan.

* * * * *